(12) United States Patent
Zur et al.

(10) Patent No.: US 11,486,958 B2
(45) Date of Patent: Nov. 1, 2022

(54) METHOD AND APPARATUS FOR REDUCING MAGNETIC TRACKING ERROR

(71) Applicant: PENUMBRA, INC., Alameda, CA (US)

(72) Inventors: Oded Y. Zur, Kochav-Yair (IL); Alejandro Santiago Diaz, Ross, CA (US); Michael D. Collins, Santa Cruz, CA (US); Ran Bar-On, Tel Aviv (IL); Ron Barak, Tel Aviv (IL); Amir Rubin, Los Gatos, CA (US)

(73) Assignee: PENUMBRA, INC., Alameda, CA (US)

( * ) Notice: Subject to any disclaimer, the term of this patent is extended or adjusted under 35 U.S.C. 154(b) by 862 days.

(21) Appl. No.: 16/368,543

(22) Filed: Mar. 28, 2019

(65) Prior Publication Data
US 2019/0353745 A1 Nov. 21, 2019

Related U.S. Application Data

(60) Provisional application No. 62/673,084, filed on May 17, 2018.

(51) Int. Cl.
| | | |
|---|---|---|
| *G01S 5/02* | (2010.01) | |
| *G01S 17/875* | (2020.01) | |
| *G06N 7/00* | (2006.01) | |
| *G01S 3/32* | (2006.01) | |

(52) U.S. Cl.
CPC ............. *G01S 5/021* (2013.01); *G01S 3/325* (2013.01); *G01S 17/875* (2013.01); *G06N 7/005* (2013.01)

(58) Field of Classification Search
CPC ........... G01S 5/21; G01S 3/325; G01S 17/875
USPC ..................... 342/146, 463, 357.24, 357.31
See application file for complete search history.

(56) References Cited

U.S. PATENT DOCUMENTS

| | | |
|---|---|---|
| 4,737,794 A | 4/1988 | Jones |
| 2011/0095940 A1* | 4/2011 | Breed ..................... G01S 15/42 342/146 |

\* cited by examiner

*Primary Examiner* — Bo Fan
(74) *Attorney, Agent, or Firm* — Haley Guiliano LLP (57) ABSTRACT

A method and apparatus for reducing magnetic tracking error in the position and orientation determined in an electromagnetic tracking system is disclosed. In some embodiments, a corrected position and orientation is blended with an uncorrected position and orientation based upon the calculated probability of each. To determine a corrected position and orientation, data from an IMU in the receiver is used to obtain a constraint on the orientation. In other embodiments, the amount of detected error due to electromagnetic distortion is measured. Any error is first assumed to be from "floor distortion," and a correction is applied. If the error is still deemed too great, a constraint is again obtained from IMU data. Using this constraint, another correction for the distortion is made. The solution from this correction may be blended with a standard solution and the solution from the floor distortion to arrive at a final solution.

20 Claims, 3 Drawing Sheets

METHOD AND APPARATUS FOR REDUCING MAGNETIC TRACKING ERROR

This application claims priority to Provisional Application No. 62/673,084, filed May 17, 2018, which is incorporated by reference herein in its entirety.

FIELD OF THE INVENTION

The present invention relates generally to magnetic tracking devices, and more particularly to the reduction of magnetic tracking error due to distortion of the magnetic field in such devices.

BACKGROUND OF THE INVENTION

AC electromagnetic trackers, and the processors that determine the position and orientation of such trackers, are well known to those of skill in the art. One such example, U.S. Pat. No. 4,737,794 ("the '794 patent"), teaches a "method and apparatus for determining remote object orientation and position with an electromagnetic coupling." It shows a transmitter comprising a plurality of radiating antennas, located at a source to provide a plurality of magnetic fields spanning three dimensional space and defining a source reference coordinate frame, and a receiver comprising a plurality of receiving antennas located on an object to be tracked for receiving that field. A processor receives the outputs from the receiving antennas and converts the received components of the transmitted magnetic fields into remote object position and orientation relative to the source reference coordinate frame. The antennas may be, for example, dipole antennas, loop antennas, or coil antennas. The terms "antennas" and "coils" are used interchangeably herein.

In practice, the transmitter typically includes three radiating antennas, often situated on orthogonal axes, that are either frequency division multiplexed (FDM) at three orthogonal frequencies or time division multiplexed (TDM) at three time slots. The receiver also typically includes three receiving antennas.

One common application is tracking a user for the purpose of playing a video game or being immersed in a virtual reality world. In some prior art embodiments, a transmitter may be located in a fixed position, such as in a local base station, video game console or other apparatus. A receiver in a tracking device provides information about the sensed magnetic fields to a processor, which derives the position and orientation of the tracking device relative to the base station from such information.

There are a number of factors that limit the accuracy of such magnetic tracking systems. The strength of the magnetic fields between a tracking device and a base station transmitter suffers from attenuation over distance, which decreases accuracy in the detection of the magnetic fields by the tracker. Objects located between the tracking device and the base station may cause distortion in the magnetic fields, particularly if those objects contain ferrous materials. Conducting surfaces in the environment may also contain eddy currents induced by the generated magnetic fields that in turn generate secondary magnetic fields that interfere with the ability of sensors to accurately detect the source magnetic fields.

These factors can result in errors in the position and orientation determined by an electromagnetic tracking system. It is desirable to be able to create a magnetic tracking system that can dynamically correct for such errors.

SUMMARY OF THE INVENTION

A system and method is disclosed which reduces magnetic tracking error in the position and orientation determined by an electromagnetic tracking system.

One embodiment discloses a system for reducing magnetic tracking error in a determined position and orientation of a receiver in an electromagnetic tracking system, comprising: a transmitter having a plurality of source magnetic coils configured to generate a magnetic field, and an inertial measurement unit; a receiver having a plurality of sensor magnetic coils configured to sense the magnetic field and generate magnetic sensor data, and an inertial measurement unit; and a processor configured to: determine that there is error in the determined position and orientation of the receiver relative to the transmitter as represented by a first signal matrix created using the magnetic sensor data from the sensor magnetic coils; determine that the error in the position and orientation of the receiver represented by the first signal matrix exceeds a predetermined threshold; determine a first correction factor to compensate for the error in the position and orientation of the receiver represented by the first signal matrix, and compute a second signal matrix by applying the first correction factor to the first signal matrix; determine that error in the position and orientation of the receiver represented by the second signal matrix exceeds the predetermined threshold; determine a second correction factor to compensate for the error in the position and orientation of the receiver represented by the second signal matrix, and compute a third signal matrix by applying the second correction to the second signal matrix; and determine an error-corrected position and orientation of the receiver by blending positions and orientations derived from the first, second and third signal matrices.

Another embodiment discloses a method of reducing magnetic tracking error in a determined position and orientation of a receiver in an electromagnetic tracking system, comprising: generating a magnetic field from a plurality of source magnetic coils in a transmitter; generating magnetic sensor data by sensing the magnetic field using a plurality of sensor magnetic coils in a receiver; generating inertial measurement data from first and second inertial measurement units, one inertial measurement unit in the transmitter and the other inertial measurement unit in the receiver; determining by a processor that there is error in a determined position and orientation of the receiver relative to the transmitter as represented by a first signal matrix computed using the magnetic sensor data from the sensor magnetic coils; determining by the processor that the error in the position and orientation of the receiver represented by the first signal matrix exceeds a predetermined threshold; determining by the processor a first correction factor to compensate for the error in the position and orientation of the receiver relative to the transmitter as represented by the first signal matrix, and computing by the processor a second signal matrix by applying the first correction factor to the first signal matrix; determining by the processor that error in the position and orientation of the receiver represented by the second signal matrix exceeds the predetermined threshold; determining by the processor a second correction factor to compensate for the error in the position and orientation of the receiver relative to the transmitter as represented by the second signal matrix, and computing by the processor a third signal matrix by applying the second correction to the second signal matrix; and determining by the processor an error-corrected position and orientation of the receiver by blending positions and orientations derived from the first, second and third signal matrices.

Still another embodiment discloses a non-transitory computer readable storage medium having embodied thereon instructions for causing a computing device to execute a method for reducing magnetic tracking error in the position and orientation of a receiver in an electromagnetic tracking system, the method comprising: determining by a processor that there is error in a determined position and orientation of the receiver relative to the transmitter as represented by a first signal matrix created using the magnetic sensor data from the sensor magnetic coils; determining by the processor that the error in the position and orientation of the receiver represented by the first signal matrix exceeds a predetermined threshold; determining by the processor a first correction factor to compensate for the error in the position and orientation of the receiver represented by the first signal matrix, and computing by the processor a second signal matrix by applying the first correction factor to the first signal matrix; determining by the processor that error in the position and orientation of the receiver represented by the second signal matrix exceeds the predetermined threshold; determining by the processor a second correction factor to compensate for the error in the position and orientation of the receiver represented by the second signal matrix, and computing by the processor a third signal matrix by applying the second correction to the second signal matrix; and determining by the processor an error-corrected position and orientation of the receiver by blending positions and orientations derived from the first, second and third signal matrices.

Yet another embodiment discloses a system for reducing magnetic tracking error in a determined position and orientation of a receiver in an electromagnetic tracking system, comprising: a transmitter having a plurality of source magnetic coils configured to generate a magnetic field, and an inertial measurement unit; a receiver having a plurality of sensor magnetic coils configured to sense the magnetic field and generate magnetic sensor data, and an inertial measurement unit; and a processor configured to: determine that there is error in the determined position and orientation of the receiver relative to the transmitter as represented by a first signal matrix created using the magnetic sensor data from the sensor magnetic coils; determine that the error in the position and orientation of the receiver represented by the first signal matrix exceeds a predetermined threshold; determine a first correction factor to compensate for the error in the position and orientation of the receiver represented by the first signal matrix, and compute a second signal matrix by applying the first correction factor to the first signal matrix; determine that error in the position and orientation of the receiver represented by the second signal matrix exceeds the predetermined threshold; determine a second correction factor to compensate for the error in the position and orientation of the receiver represented by the second signal matrix, and compute a third signal matrix by applying the second correction to the second signal matrix; determine an error-corrected signal matrix by blending the first, second and third signal matrices; and derive an error-corrected position and orientation of the receiver from the error-corrected signal matrix.

Yet another embodiment discloses a method of reducing magnetic tracking error in a determined position and orientation of a receiver in an electromagnetic tracking system, comprising: generating a magnetic field from a plurality of source magnetic coils in a transmitter; generating magnetic sensor data by sensing the magnetic field using a plurality of sensor magnetic coils in a receiver; generating inertial measurement data from first and second inertial measurement units, one inertial measurement unit in the transmitter and the other inertial measurement unit in the receiver; determining by a processor that there is error in a determined position and orientation of the receiver relative to the transmitter as represented by a first signal matrix computed using the magnetic sensor data from the sensor magnetic coils; determining by the processor that the error in the position and orientation of the receiver represented by the first signal matrix exceeds a predetermined threshold; determining by the processor a first correction factor to compensate for the error in the position and orientation of the receiver relative to the transmitter as represented by the first signal matrix, and computing by the processor a second signal matrix by applying the first correction factor to the first signal matrix; determining by the processor that error in the position and orientation of the receiver represented by the second signal matrix exceeds the predetermined threshold; determining by the processor a second correction factor to compensate for the error in the position and orientation of the receiver relative to the transmitter as represented by the second signal matrix, and computing by the processor a third signal matrix by applying the second correction to the second signal matrix; determining by the processor an error-corrected signal matrix by blending the first, second and third signal matrices; and deriving an error-corrected position and orientation of the receiver from the error-corrected signal matrix.

Still yet another embodiment discloses a system for reducing magnetic tracking error in a determined position and orientation of a receiver in an electromagnetic tracking system, comprising: a transmitter having a plurality of source magnetic coils configured to generate a magnetic field; a receiver having a plurality of sensor magnetic coils configured to sense the magnetic field and generate magnetic sensor data, and an inertial measurement unit; and a processor configured to: calculate a proportion of error in an uncorrected position and orientation of the receiver relative to the transmitter as represented by a signal matrix created using the magnetic sensor data from the sensor magnetic coils; determine a corrected position and orientation of the receiver relative to the transmitter as represented by a signal matrix created using the magnetic sensor data and constrained by data from the inertial measurement unit; calculate a proportion of error in the corrected position and orientation of the receiver relative to the transmitter; determine a probability for the uncorrected position and orientation of the receiver and the corrected position and orientation of the receiver using the proportions of error; and determine a position and orientation of the receiver relative to the transmitter by interpolating between the uncorrected position and orientation and the corrected position and orientation based upon the determined probabilities of each.

Yet still another embodiment discloses a method of reducing magnetic tracking error in a determined position and orientation of a receiver in an electromagnetic tracking system, comprising; generating a magnetic field from a plurality of source magnetic coils in a transmitter; generating magnetic sensor data by sensing the magnetic field using a plurality of sensor magnetic coils in a receiver; generating inertial measurement data from an inertial measurement unit in the receiver; calculating by a processor a proportion of error in an uncorrected position and orientation of the receiver relative to the transmitter as represented by a signal matrix created using the magnetic sensor data from the sensor magnetic coils; determining by the processor a corrected position and orientation of the receiver relative to the transmitter as represented by a signal matrix created using the magnetic sensor data and constrained the inertial measurement data; calculating by the processor a proportion of error in the corrected position and orientation of the receiver relative to the transmitter; determining by the processor a probability for the uncorrected position and orientation of the receiver and the corrected position and orientation of the receiver using the proportions of error; and determining by the processor a position and orientation of the receiver relative to the transmitter by interpolating between the uncorrected position and orientation and the corrected position and orientation based upon the determined probabilities of each.

Yet still another embodiment discloses a non-transitory computer readable storage medium having embodied thereon instructions for causing a computing device to execute a method for reducing magnetic tracking error in the position and orientation of a receiver in an electromagnetic tracking system, the method comprising: receiving magnetic sensor data representing the sensing by sensor magnetic coils in the receiver of a magnetic field generated by source magnetic coils in a transmitter, and inertial measurement data from an inertial measurement unit in the receiver; calculating a proportion of error in an uncorrected position and orientation of the receiver relative to the transmitter as represented by a signal matrix created using the magnetic sensor data from the sensor magnetic coils; determining a corrected position and orientation of the receiver relative to the transmitter as represented by a signal matrix created using the magnetic sensor data and constrained by the inertial measurement data; calculating by the processor a proportion of error in the corrected position and orientation of the receiver relative to the transmitter; determining a probability for the uncorrected position and orientation of the receiver and the distortion-corrected position and orientation of the receiver using the proportions of error; and determining a position and orientation of the receiver relative to the transmitter by interpolating between the uncorrected position and orientation and the distortion-corrected position and orientation based upon the determined probabilities of each.

DETAILED DESCRIPTION OF THE INVENTION

A system and method is disclosed which reduces magnetic tracking error due to various types of distortion of the magnetic field in the position and orientation determined by use of an electromagnetic tracking system.

In some embodiments, the tracking system includes an electromagnetic tracking system having a transmitter and receiver, and inertial measurement units (IMUs), typically containing at least an accelerometer and gyroscope, attached to both the receiver and the transmitter. Combining the measurements from the tracking system and the IMUs can significantly reduce the effect of distortion of the magnetic field on the solved position and orientation. In other embodiments, cameras or other optical systems may also be used, as discussed further below.

As above, distortion in an electromagnetic tracking system may have a variety of causes, and the system and method described herein, which is fast and easily applied, in some cases may detect error in the determination of position and orientation of a receiver due to this electromagnetic distortion. In some embodiments, the amount of detected error due to electromagnetic distortion is first measured. If the error due to distortion is under a predetermined threshold, the uncorrected position and orientation determined by the tracking system (the "standard solution") is taken to be the correct position and orientation.

The described system and method may be applied in a variety of ways. In some embodiments, if error due to electromagnetic distortion above the threshold is detected, a correction algorithm that uses the IMU readings as constraints may be used.

An estimate of the orientation for the receiver is obtained by combining measurements from the electromagnetic tracking system and the IMU(s). The IMU provides a constraint for the orientation. Using this constraint, a correction is made to the position and orientation of the receiver. The solution from the corrected position and orientation may be blended with the standard solution to pick a final solution having the highest confidence. In some cases, as described below, a weighted function may be used to combine the standard solution with the corrected position and orientation to avoid artifacts that may result from applying a given solution in a binary "yes-or-no" decision; the weighting may be based upon a calculated probability for each solution.

In other embodiments, a first attempt at reduction of the distortion is made by assuming that the distortion is "floor distortion," resulting from eddy currents in the floor, ceiling and or walls caused by the source magnetic fields, and correcting for such distortion. If correcting for floor distortion does not reduce the error to below the threshold, in some cases it may be assumed that the distortion is of a more general nature, and a more general correction applied using the constraint from the IMU as above.

In an electromagnetic tracking system the three magnetic fields are sensed and separated to generate a signal that is a 3×3 signal matrix, called "SigMat" herein, which represents a total of nine measures of the three transmitted magnetic fields; each column corresponds to the sensed field from a separate one of the three coils of the transmitter, and each row corresponds to a separate one of the three coils of the receiver. One example of a 3×3 matrix that might represent SigMat is:

| | | |
|---|---|---|
| a11 | a12 | a13 |
| a21 | a22 | a23 |
| a31 | a32 | a33 | where a11 through a33 represent the nine measures of the three magnetic fields, one measure of each magnetic field by each of the three receiver coils. It is the evaluation of SigMat that results in a determination of the position of the receiver.

Determining a SigMat from a particular position and orientation of the receiver is straightforward using the formula for the electromagnetic fields. A transmitter "TX" generates, in good approximation, three simple dipole fields. One of skill in the art will appreciate that it is relatively straightforward to predict the SigMat values from a particular position and orientation by using the formula for dipole fields. The inverse problem, i.e., determining the position and orientation of the receiver from a SigMat, is usually harder, but in the case of three dipole fields generated by orthogonal coils can also be solved analytically. In other cases, iterative methods (e.g., successive approximations) are usually used, and such iterative methods may also be used in the case of orthogonal fields as well.

Figure 1:
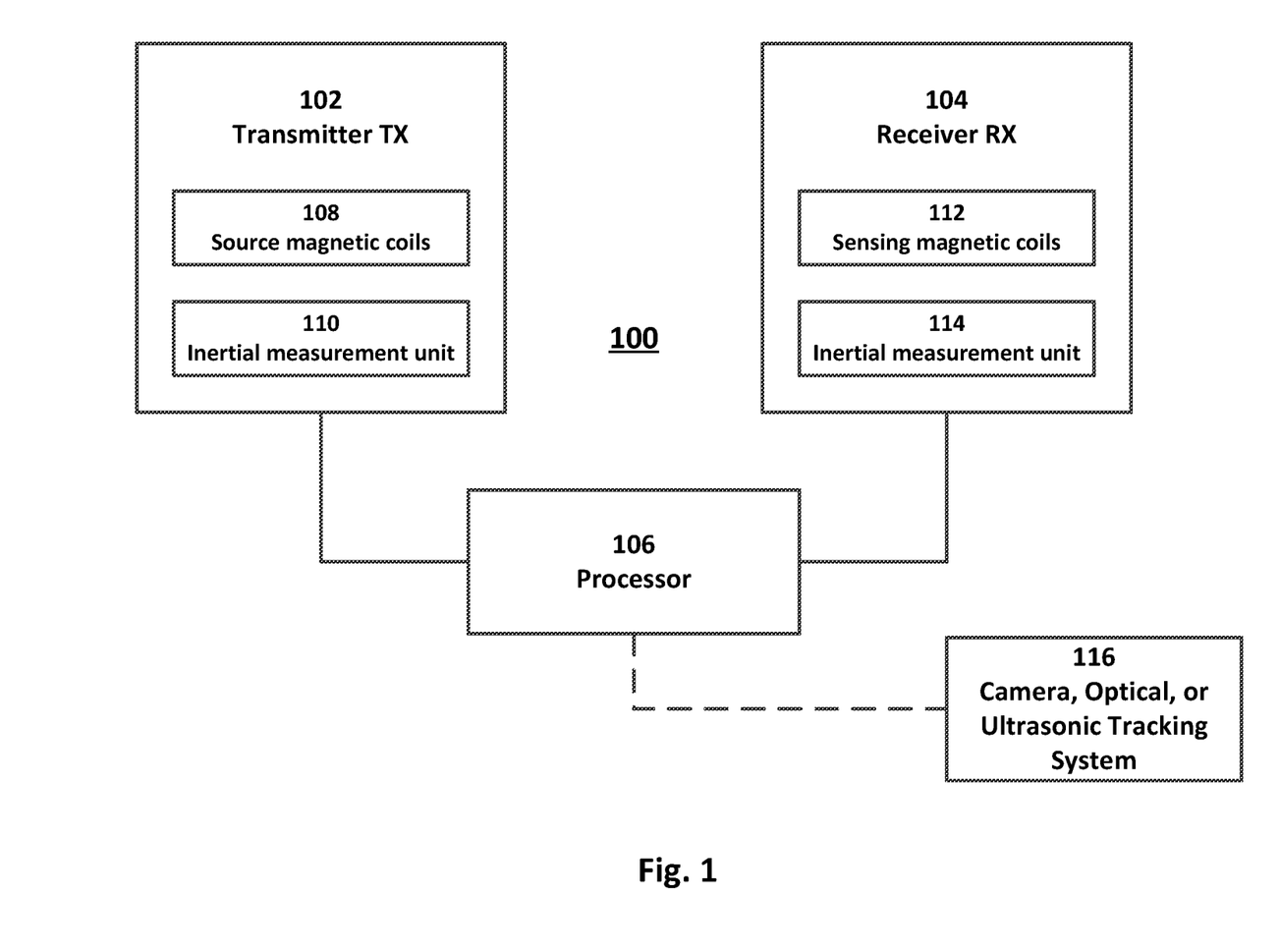
FIG. 1 is a block diagram of a system for reducing magnetic tracking error due to distortion of the magnetic field in a magnetic tracking system according to one embodiment.

FIG. 1 is a block diagram of a system for reducing magnetic tracking error due to distortion of the magnetic field in a magnetic tracking system according to one embodiment. System 100 contains a transmitter TX 102, a receiver RX 104 and a processor 106. As above, transmitter 102 is often located in a base station, while receiver 104 is attached to some movable object or person. Also as above, transmitter 102 contains source magnetic coils 108 for generating magnetic fields, while receiver 104 contains sensing magnetic coils 112 for sensing the magnetic fields. In the present embodiment, transmitter 102 and receiver 104 each contain an IMU 110 and 114, respectively; IMUs 110 and 114 each have a known physical offset from the respective source magnetic coils and sensing magnetic coils.

System 100 also contains processor 106, which generates a SigMat and performs error reduction as described herein from the data it receives from transmitter 102 and receiver 104, and then generates a position and orientation of the receiver. In some embodiments, processor 106 may also utilize information from an optional camera, optical, or ultrasonic system 116.

To reduce the distortion error, the processor first evaluates the SigMat that is generated from sensing coil data. In a neutral, theoretical setting the following electromagnetic equation is fulfilled:

$$X = N^t B(r) \qquad \text{(Equation 1)}$$

where:
X is the 3×3 SigMat matrix (as sensed in receiver coordinates);
N is the 3×3 orthonormal orientation (in transmitter coordinates);
r is the 3×1 position vector (in transmitter coordinates); and
B is the 3 magnetic fields at position r as the columns of a 3×3 matrix (in transmitter coordinates).

With distortion and interference, Equation 1 changes to:

$$X = N^t (B(r) + E(r)) \qquad \text{(Equation 2)}$$

where E(r) is an "error matrix," i.e., an additional 3×3 unknown magnetic field due to distortion or interference, added by super-position to the theoretical electromagnetic dipole fields. When this error matrix E(r) is present, the SigMat X will be erroneous, and will result in the system determining an incorrect position and orientation of the receiver.

To correct this, it is desirable to find the value of the error matrix E(r), and then subtract it from the SigMat X in order to find a resulting SigMat and a corresponding position and orientation that are free from errors due to distortion or interference.

There are several methods for finding the value of E(r) using additional information available from other sources, such as IMUs, optical systems, or other means that can be included in the system. This can allow for E(r) to be subtracted from X as above to reduce the distortion present in the SigMat.

It is desirable that these methods use commonly available means and components that can be added to a system easily and at a reasonable cost, that operate in real time without requiring any pre-operation mapping or environmentally-dependent calibration, and that do not require high computational resources.

Certain assumptions may be applied to the error matrix E(r) to deal with common types of distortion and interference. A first assumption is that the distortion is of a type commonly called "floor distortion," which more accurately is due to eddy currents induced in the floor, ceiling and/or walls by the alternating magnetic fields generated by the source antennas. The undesired eddy currents in turn induce magnetic fields of their own, thus acting as unknown magnetic sources that may be considered to be the "distortion field."

In one embodiment, these eddy currents are approximated to be flowing in a transmitter having a shape similar to a large wire loop. Each of the three magnetic fields generated by the source antennas will create some flux through the wire loop and will induce current around the loop; thus, the three source antennas induce current around the loop in three different frequencies and gains (where the source antennas are FDM). (One of skill in the art will appreciate that while wall distortion can also be described as a wire loop in the same way as floor and ceiling distortion, applying the wire loop model to walls is less effective than applying it to floors and ceilings as described and explained below.)

All three induced magnetic fields have the same direction, since in the approximation they originate from the same wire loop. (Where the source antennas are TDM, these three magnetic fields have three different times and again three different gains, but only one direction).

With this approximation, Equation 2 above now becomes:

$$X = N^t (B(r) + V \cdot P) \qquad \text{(Equation 3)}$$

where:
V is the 3×1 direction of the distortion field (the same for all 3 frequencies), i.e., a three-dimensional direction represented as a unit vector; and
P is the 1×3 gains of the distortion field for each frequency, which depends on the flux of each TX coil (or frequency) through the modeled wire loop.

Thus, to model the distortion, the direction V of the distortion field and the gains per frequency P must be known. With enough sensor readings, it is possible to automatically solve for V and P using optimization. However, since only the 3×3 SigMat is available, external constraints must be used to solve for the distortion. These constraints come from the IMUs.

As above, in the present approach the tracking system has IMUs on both the transmitter and the receiver. As is known in the art, a real-time gravity vector can be efficiently extracted from the IMU accelerometer and gyroscope by means of sensor fusion using, for example, a Kalman, Madgwick, or Mahony filter.

A correct position and orientation solution must satisfy the "gravity equation," which is:

$$N \cdot G_{rx} = G_{tx} \qquad \text{(Equation 4)}$$

where:
N is the 3×3 orthonormal orientation (in transmitter coordinates); and $G_{rx}$ and $G_{tx}$ are the IMU gravity vectors of the receiver and transmitter, respectively.

The gravity equation can be used as a constraint while solving for the position and orientation; since the value of the receiver gravity vector $G_{rx}$ must be transferred to the transmitter gravity vector $G_{tx}$, it is not possible to solve for any arbitrary orientation, but only that related to the receiver gravity vector $G_{rx}$ and to the transmitter gravity vector $G_{tx}$. Thus, instead of there being three angles, i.e., degrees of freedom (DOF), of the orientation N, there is now just one, i.e., the roll about gravity. Further, not only does the use of the IMU reduce the number of degrees of freedom, but it also shows where the floor and ceiling are in local transmitter and receiver coordinates (assuming the floor and ceiling are leveled so that they are perpendicular to the gravity vector). (It is because the walls are not perpendicular to the gravity vector, but rather are aligned with it, that the wire loop model is not as effective for wall distortion, as mentioned above.)

Solving for this case of floor distortion, it may be assumed that the distortion field, in receiver coordinates, is aligned with $G_{rx}$, because the distortion may manifest as increased or decreased signal energy in a direction perpendicular to the surface of the distortion plane, i.e., the ground. Since the IMU gravity vector of the transmitter $G_{tx}$ is also the direction of the distortion field V in Equation 3 above, this allows the electromagnetic equation to become:

$$X = N^t(B(r) + G_{tx} \cdot P)$$

or $$X = N^t B(r) + G_{rx} \cdot P \quad \text{(Equation 5)}$$

To solve Equation 5, a total of 7 parameters must be found. These are:

Θ is the roll angle for the orientation N;
r is the three-dimensional position vector as above; and
P is the three distortion gains, also as above.

Since the SigMat has nine values, i.e., more than the seven needed, a unique solution is possible. Although it is hard to solve Equation 5 analytically, iterative optimization methods may be used to minimize a cost function F:

$$F(\Theta, r, P) = \|N(\Theta)^t B(r) + G_{rx} \cdot P - X\|^2 \quad \text{(Equation 6)}$$

To minimize cost function F, first the values of Θ and r are initialized using the analytic dipole solution (ignoring distortion) or by tracking. P is initialized to a value of (0, 0, 0).

Next, the Jacobian (as is known in the art, this refers to the Jacobian matrix and its determinant) of F(Θ, r, P) is computed using numerical or analytic derivatives, and the Jacobian is used to compute a step which decreases the value of F. Iterations of this step are performed until a desired level of tolerance is achieved. For example, an algorithm such as the Levenberg-Marquardt algorithm, also known as the damped least-squares method, may be used.

The calculation of distortion, such as the floor distortion above, is used to reduce the error in the computed position and orientation. Each proposed value of the position and orientation may be given an error value. This is done by comparing the SigMat derived from the sensed magnetic field at the receiver to a theoretical SigMat, taking into account the position and orientation of the receiver.

The receiver senses the magnetic field in its local coordinate system, and determines a SigMat from this; this SigMat is denoted as $X_{measured}$. From this, the system can determine a position and orientation. To evaluate whether this position and orientation contains an error (possibly due to distortion), the SigMat corresponding to the theoretical dipole fields model at this solved position and orientation is calculated. The theoretic magnetic dipole field is computed at the receiver position (in transmitter coordinates), and then rotated according to the receiver's orientation to bring it into the receiver's local coordinate system. The resulting SigMat for the theoretical magnetic field is denoted as $X_{PnO}$.

The error $E_x$ can then be calculated by:

$$E_X = \frac{\|X_{PnO} - X_{measured}\|}{\|X_{measured}\|} \quad \text{(Equation 7)}$$

This is a dimensionless quantity that reflects the proportion of unexplained measured SigMat compared to the theoretical model (the recomputed SigMat).

If, for example, the computed $E_x$ is greater than 20%, this indicates that at least 20% of the measured SigMat is not explained by the recomputed SigMat, and this indicates that there is some type of electromagnetic distortion or interference.

Now suppose the floor-distortion optimization above is used (by minimizing Equation 6), and a new position and orientation is determined, which will be different. The distortion-subtracted SigMat (according to the physical model) at the new position and orientation is computed, the error $E_x$ is again computed.

If $E_x$ is, for example, now 3%, this means that 97% of the measured SigMat is explained by the recomputed SigMat, which indicates that most of the distortion was coming from the floor (and/or ceiling). On the other hand, if $E_x$ is still over 20% then there is still some unknown distortion from a source other than the floor. A further attempt can be made to correct for this distortion.

The gravity equation can also be used for distortion detection. When solving for a position and orientation normally (i.e., assuming no distortion), the resulting solution might not comply with the gravity equation due to distortion. The error may be quantified as:

$$E_g = |N \cdot G_{rx} - G_{tx}| \quad \text{(Equation 8)}$$

This is again a dimensionless quantity which in combination with $E_x$ may be used for detecting distortion.

$E_x$ and $E_g$ may be used to estimate the probability of distortion in the measured SigMat. When no distortion is present, $E_x$ and $E_g$ are expected to be low, i.e., the SigMat should be perfectly explained and the gravity equation should be fulfilled. But when distortion of the magnetic field affects the measurements both $E_x$ and $E_g$ climb to levels which allow for the detection of distortion. Instead of setting hard thresholds for distortion detection in $E_x$ and $E_g$, soft-thresholds using sigmoid-type functions are used. A sigmoid function grows smoothly from 0 to 1 with a knee at a certain soft-threshold. It allows for smooth transitions between states. For distortion detection the following probabilities are constructed:

$$P_X = \exp\left(-\frac{E_X^2}{2\sigma_X^2}\right) \quad \text{(Equation 9)}$$

$$P_g = \exp\left(-\frac{E_g^2}{2\sigma_g^2}\right) \quad \text{(Equation 10)}$$

$$P_{final} = P_X \cdot P_g \quad \text{(Equation 11)}$$

where $P_X$ is the standard solution's level of confidence due to unexplained SigMat (as described above) and $P_g$ is the standard solution's level of confidence due to the gravity equation.

When distortion is not present and everything is perfectly explained, both $E_x$ and $E_g$ are nearly zero, so that $P_X$ and $P_g$ are nearly 1, i.e., there is almost 100% confidence ($P_{final} \approx 1$) in the standard solution. Alternatively, when distortion is present then $E_x$ and $E_g$ are expected to grow significantly ($E_X > \sigma_X$, $E_g > \sigma_g$), which would make $P_X$ and $P_g$ drop down to zero, so that $P_{final}$ would be ~0%, indicating that distortion is present and the standard solution is unreliable. $P_{final}$ can then be used as the interpolation weight for the standard solution in the final blended solution. For example, in some embodiments one can interpolate between the standard solution and the general distortion solution based on the reliability of the standard solver ($P_{final}$). The final output of the blended solution would then be:

$$T_{final} = \text{interp}(T_{standard}, T_{general}, P_{final}, 1 - P_{final}) \quad \text{(Equation 12)}$$

where $T_{final}$ is the final position and orientation, which is an interpolation between the standard solution and the general distortion-corrected solution with weights $P_{final}$ and $1 - P_{final}$, respectively, expressed as a standard 4×4 transformation matrix. When no distortion is present $P_{final}$ would be nearly 1, effectively choosing $T_{standard}$ in the above interpolation, i.e., the weighting of the standard solution would be near or at 100% and the corrected solution would have little or no weight. When distortion is present $P_{final}$ would drop down to 0, i.e., no weight, effectively choosing $T_{general}$, with a smooth transition between these choices due to the smooth nature of $P_{final}$ and the interpolation formula.

In the more general case, in addition to the floor, ceiling and wall distortion above, other objects, such as furniture, computers and other electrical devices may cause distortion. While the gravity equation (Equation 4 above) still applies in the general case, it is difficult to predict the direction of the distortion V, which no longer is perpendicular exclusively to the floor or walls. One could solve for V by means of optimization if there was more information than just a 3×3 SigMat. Instead, other sources of information, such as an IMU, or in some embodiments an optical device such as a camera, can be used to force more constraints on the orientation of the receiver, that eventually leads to a much more accurate position solution as well.

As above, an IMU typically contains at least an accelerometer and a gyroscope, and may contain a magnetometer as well. In classical IMU methods, information from the accelerometer and gyroscope, and the magnetometer (if present), may be "fused" using sophisticated filters, such as a Kalman, Madgwick, or Mahony filter, to estimate the IMU's orientation in the Earth's coordinate system. This allows for the effective approximation of the Earth's gravity vector.

When distortion is present, relying solely on the electromagnetic solution may result in a poor determination of the position and orientation. By combining the position and orientation from the electromagnetic data with the IMU fusion data, a full relative rx to tx orientation N can be tracked without drift. The orientation as tracked by the IMU provides a significant constraint for the electromagnetic solution, causing a solution having a good position and orientation even when the magnetic fields are extremely distorted. The electromagnetic equation for optimization now becomes:

$$X = N_{fusion}{}^t (B(r) + V \cdot P) \quad \text{(Equation 13)}$$

where $N_{fusion}$ is now the 3×3 orthonormal orientation (in transmitter coordinates), in some cases with the gravity vector constraint included, and in others with the last good orientation being updated by integration of the IMU gyroscope data of both the receiver and transmitter;

r is the three-dimensional position vector as above; and

P is the three distortion gains, also as above; and

V is again a unit vector representing the direction of the distortion.

$N_{fusion}$ represents the orientation of the receiver (in transmitter coordinates) as computed by an algorithm that combines rotation of the IMU and feedback from other orientation solutions, and interpolates between them based upon the value of $E_x$ in Equation 7. In effect, $N_{fusion}$ tracks rotation from the IMU when distortion is high, tracks orientation from the electromagnetic data when distortion is low, and updates gyroscope heading information from the fused orientation so as to counteract drift in the standalone gyroscope integration. (Note that in many cases the full $N_{fusion}$ constraint is strong enough, so the electromagnetic solution will be forced to include the correct position and orientation even without V·P, which serves as the physical modeling of the distortion, so V·P may be omitted from Equation 13 above.)

Because r, P and V contain 8 unknowns, and SigMat has 9 values, it should be possible to find a unique solution for X. A search is made for values of r, P and V which minimize the cost function:

$$F(r, V, P) = \| N^t B(r) + V \cdot P - X \|^2 \quad \text{(Equation 14)}$$

Again, this is done by iterative optimization, rather than direct solution.

One of skill in the art will appreciate that each of the devices in an IMU, considered alone, has limitations. A gyroscope may drift after long integration, although the Earth's magnetic field, if not distorted, may be used as a reference to prevent such drifting in a full accelerometer-plus-gyroscope-plus-magnetometer IMU fusion. Small metallic objects, such as keys, cellular phones, etc, easily distort magnetometer readings. Standard magnetometers are also subject to soft-iron and hard-iron errors. It is for these reasons that magnetometers are usually highly inaccurate and unstable.

On the other hand, by combining an electromagnetic tracking system with an IMU fusion, if the electromagnetic fields are distorted after a correct orientation has been determined, the gyroscope integration (in both the transmitter and receiver IMUs) will continue tracking the correct orientation regardless of the new distortion. Further, the final orientation will thus be unaffected by the distortion and might only slightly drift even after a long period of time due to long gyroscope integration.

It will be appreciated that the more general case of distortion correction relies upon accurate tracking of the value of $N_{fusion}$, again subject to limitations such as gyroscope drift as above.

Simply comparing the proportion of distortion as above to a threshold and switching to one of the distortion models may result in "decision flipping" artifacts. To avoid this, in some embodiments, the system may be programmed to blend the results from the electromagnetic solution alone, the floor distortion model and the more general distortion model, depending upon the amount of distortion detected and the level of confidence in the result. In such cases, instead of a complete switch, a "weak" threshold may be used, and a weight between 0 and 1 determined using a sigmoid function. This weight may then be used to blend the standard electromagnetic solution with a distortion corrected solution.

Figure 2:
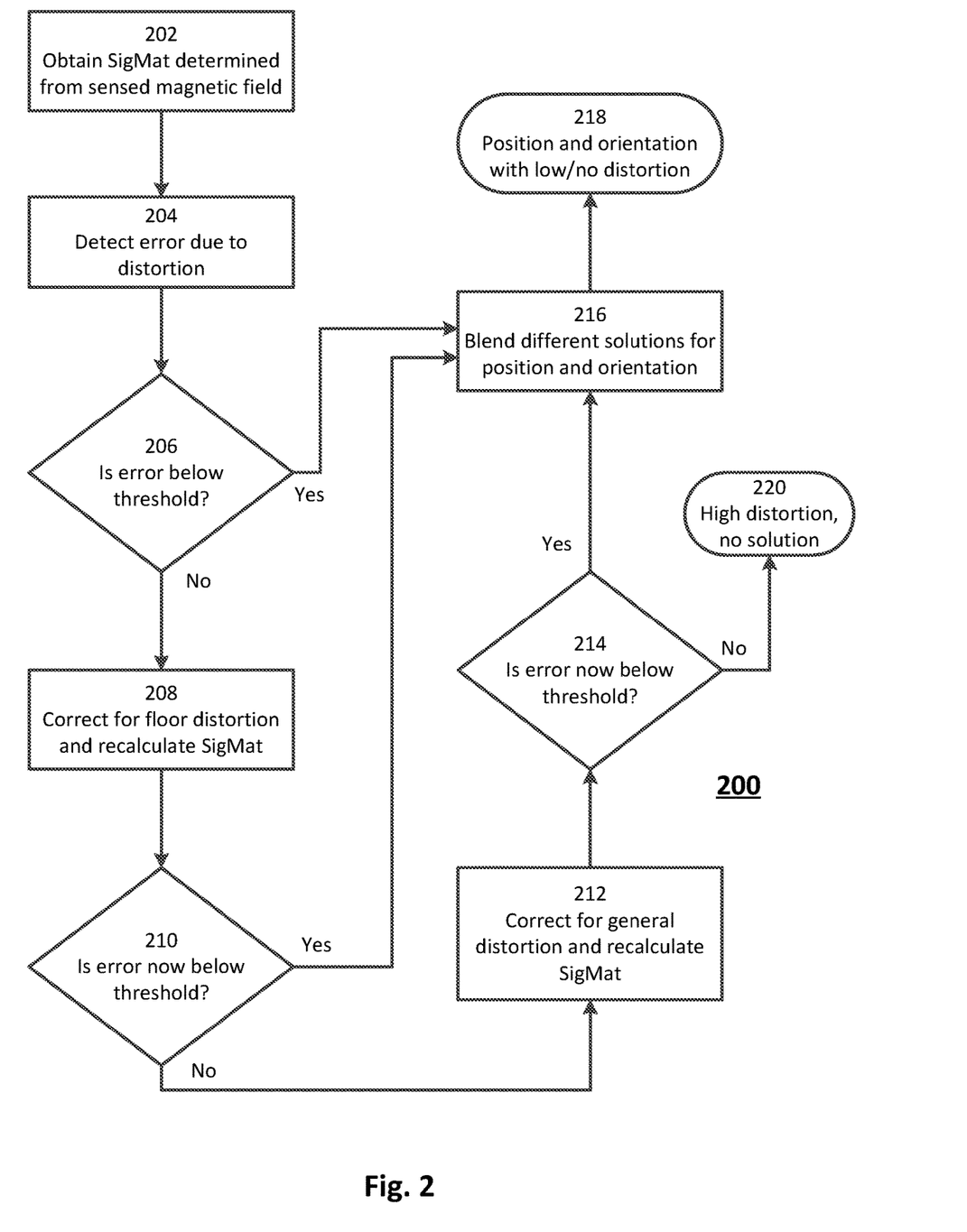
FIG. 2 is a flowchart of a process for reducing magnetic tracking error due to distortion of the magnetic field in a magnetic tracking system according to one embodiment.

FIG. 2 is a flowchart of a process 200 for reducing magnetic tracking error due to distortion of the magnetic field in a magnetic tracking system according to one embodiment. At step 202, a processor, such as processor 106 in FIG. 1, obtains a SigMat that has been determined from the sensed magnetic field, using data from the sensing coils in a receiver, such as sensing coils 112 in receiver 104 in FIG. 1. In some embodiments, the processor itself determines the SigMat from the data, while in alternative embodiments, the processor may receive a SigMat that has already been determined from such data.

At step 204, the processor detects whether there is any error in the value of SigMat due to electromagnetic distortion, for example by using a calculation such as that in Equation 7 above.

At step 206, the processor determines whether any error in the value of SigMat is below a predetermined threshold. If the error is over the threshold, at step 208 the processor assumes that there is floor distortion by using a technique such as that described above with respect to Equations 3 through 6. The processor then recomputes SigMat after removing the floor distortion from the value of SigMat by using a first correction factor.

At step 210, the processor then again determines whether any error remaining in the value of SigMat is below the threshold. If the error is still above the threshold, at step 212 the processor attempts to determine whether there is other distortion that can be removed from the value of SigMat and again, if so, removes the distortion by using a second correction factor and recomputes SigMat.

At step 214, the processor again determines whether the distortion is below the threshold. If so, at step 216 the processor will derive a solution for the position and orientation of the receiver from the uncorrected SigMat and each corrected SigMat, i.e., all of the SigMats determined to have error below the threshold in steps 206, 210 and/or 214, and determine an error-corrected position and orientation of the receiver by blending the three values of the position and orientation corresponding to the three available solutions, i.e., the position and orientation derived from the unaltered SigMat, the SigMat corrected for floor distortion, and the SigMat corrected for general distortion as above, respectively. In some embodiments, the blending of the solutions is based upon the determination of the probability of each solution, as discussed above. The processor provides the selected solution as a position and orientation that has reduced distortion, at least below the threshold, at step 218. Tests show that in some instances the distortion in the determined position of the receiver may be reduced by as much as nearly 90 percent.

If there is still distortion above the threshold even after the general distortion correction has been attempted, at step 220 the processor concludes that there is high distortion with no available solution.

In some embodiments, the derivation of a solution for position and orientation from each SigMat may be done at the same time as the obtaining of the uncorrected SigMat, or at the same time as the error correction in the case of corrected SigMats, i.e., in steps 202, 208 and 212 above, rather than in step 216, and the solutions then blended at step 216 as above. While it is believed to be more practical to blend the solutions, in some embodiments, the SigMats may be blended to determine an error-corrected signal matrix, and then a corrected solution for position and orientation derived from the blended, error-corrected SigMat, rather than blending the solutions derived from the various SigMats.

Figure 3:
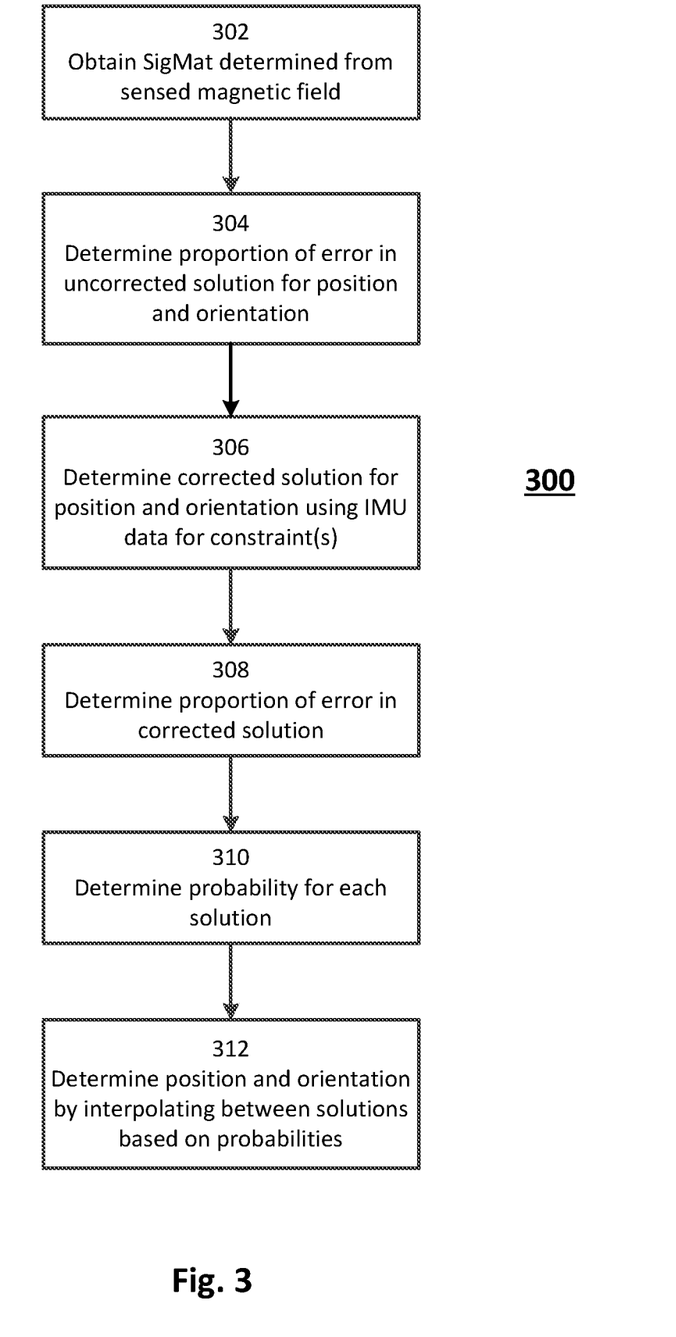
FIG. 3 is a flowchart of a process for reducing magnetic tracking error due to distortion of the magnetic field in a magnetic tracking system according to another embodiment.

FIG. 3 is a flowchart of a process 300 for reducing magnetic tracking error due to distortion of the magnetic field in a magnetic tracking system according to another embodiment. At step 302, as in step 202 of process 200 above, a processor, such as processor 106 in FIG. 1, obtains a SigMat that has been determined from the sensed magnetic field, using data from the sensing coils in a receiver, such as sensing coils 112 in receiver 104 in FIG. 1. In some embodiments, the processor itself determines the SigMat from the data, while in alternative embodiments, the processor may receive a SigMat that has already been determined from such data.

At step 304, again as in process 200 above, the processor determines the proportion of error in the uncorrected solution for position and orientation represented by the SigMat, for example by using a calculation such as that in Equation 7 above.

At step 306, the processor determines a corrected solution for the position and orientation. As above, constraints from the IMU data are placed on the orientation, for example as in equation 13 above. The processor may then, for example, determine the corrected solution by iteratively minimizing a cost function, such as that in equation 14 above, rather than solving the equation directly.

At step 308, the processor determines the proportion of error in the distortion-corrected solution for position and orientation, for example again by using a calculation such as that in Equation 7 above.

At step 310, the processor determines a probability for each of these solutions, for example by using a calculation such as that in Equations 9-11 above. As noted above, in cases where there is no distortion of the electromagnetic field, the weighting of the uncorrected solution may be almost 100%, with little or no weight given to a corrected solution, while in other cases with large amounts of distortion the corrected solution may be given most or all of the weight.

At step 312, the processor determines a position and orientation for the receiver by interpolating between the solutions, for example by using a calculation such as that in Equation 12 above. As above, this allows for smooth changes in the position and orientation, rather than allowing artifacts to arise from binary shifts from the uncorrected solution to a corrected solution.

By using the information from the IMUs in the gravity equation and $N_{fusion}$ as above, in some cases the described approach can impose additional constraints on the orientation of the receiver and solve for certain types of distortion in the generated SigMat. This in turn allows for a significant portion of that distortion to be removed from the SigMat, thus resulting in improved accuracy in the determined position and orientation of the receiver. In other embodiments, as noted above, an optical tracking system may be added, and activated when electromagnetic distortion is detected in order to provide stabilization for the distorted electromagnetic solutions.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above. It will also be apparent that in some instances the order of steps described herein may be altered without changing the result of performance of all of the described steps.

There may be a single processor, or multiple processors performing different functions of the functions described herein. One of skill in the art will appreciate how to determine which and how many processors will be appropriate for a specific intended application, and where in a given system they might be located. In some embodiments a single processor may perform all of the processing functions described herein; in other embodiments, the receiver may contain a separate processor to compute the SigMat from the sensor data.

It should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc. It may be possible to incorporate the described methods into hard-wired logic if desired. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A system for reducing magnetic tracking error in a determined position and orientation of a receiver in an electromagnetic tracking system, comprising:
    a transmitter having a plurality of source magnetic coils configured to generate a magnetic field, and an inertial measurement unit;
    a receiver having a plurality of sensor magnetic coils configured to sense the magnetic field and generate magnetic sensor data, and an inertial measurement unit; and
    a processor configured to:
        determine that there is error in the determined position and orientation of the receiver relative to the transmitter as represented by a first signal matrix created using the magnetic sensor data from the sensor magnetic coils;
        determine that the error in the position and orientation of the receiver represented by the first signal matrix exceeds a predetermined threshold;
        determine a first correction factor to compensate for the error in the position and orientation of the receiver represented by the first signal matrix, and compute a second signal matrix by applying the first correction factor to the first signal matrix;
        determine that error in the position and orientation of the receiver represented by the second signal matrix exceeds the predetermined threshold;
        determine a second correction factor to compensate for the error in the position and orientation of the receiver represented by the second signal matrix, and compute a third signal matrix by applying the second correction to the second signal matrix; and
        determine an error-corrected position and orientation of the receiver by blending positions and orientations derived from the first, second and third signal matrices.

2. The system of claim 1 wherein the processor is configured to determine the first correction factor by:
    determining a gravity vector from data obtained from the inertial measurement units in the transmitter and receiver; and
    selecting the first correction factor to compensate for eddy currents in a floor and/or ceiling.

3. The system of claim 1 wherein the processor is configured to blend positions and orientations derived from the first, second and third signal matrices by:
    determining a probability for each of the first, second and third signal matrices; and
    combining the positions and orientations derived from the first, second and third signal matrices according to the determined probabilities.

4. The system of claim 1 wherein the processor configured to determine the error-corrected position and orientation of the receiver by blending positions and orientations derived from the first, second and third signal matrices is further configured to use information from a camera, optical, or ultrasonic system.

5. A method of reducing magnetic tracking error in a determined position and orientation of a receiver in an electromagnetic tracking system, comprising:
    generating a magnetic field from a plurality of source magnetic coils in a transmitter;
    generating magnetic sensor data by sensing the magnetic field using a plurality of sensor magnetic coils in a receiver;
    generating inertial measurement data from first and second inertial measurement units, one inertial measurement unit in the transmitter and the other inertial measurement unit in the receiver;
    determining by a processor that there is error in a determined position and orientation of the receiver relative to the transmitter as represented by a first signal matrix computed using the magnetic sensor data from the sensor magnetic coils;
    determining by the processor that the error in the position and orientation of the receiver represented by the first signal matrix exceeds a predetermined threshold;
    determining by the processor a first correction factor to compensate for the error in the position and orientation of the receiver relative to the transmitter as represented by the first signal matrix, and computing by the processor a second signal matrix by applying the first correction factor to the first signal matrix;
    determining by the processor that error in the position and orientation of the receiver represented by the second signal matrix exceeds the predetermined threshold;
    determining by the processor a second correction factor to compensate for the error in the position and orientation of the receiver relative to the transmitter as represented by the second signal matrix, and computing by the processor a third signal matrix by applying the second correction to the second signal matrix; and
    determining by the processor an error-corrected position and orientation of the receiver by blending positions and orientations derived from the first, second and third signal matrices.

6. The method of claim 5 wherein determining the first correction factor further comprises:
    determining a gravity vector from data obtained from the inertial measurement units in the transmitter and receiver; and
    selecting the first correction factor to compensate for eddy currents in a floor and/or ceiling.

7. The method of claim 5 wherein blending positions and orientations derived from the first, second and third signal matrices further comprises:
   determining a probability for each of the first, second and third signal matrices; and
   combining the positions and orientations derived from the first, second and third signal matrices according to the determined probabilities.

8. The method of claim 5 wherein determining by the processor an error-corrected position and orientation of the receiver by blending positions and orientations derived from the first, second and third signal matrices also uses information from a camera, optical, or ultrasonic system.

9. A non-transitory computer readable storage medium having embodied thereon instructions for causing a computing device to execute a method for reducing magnetic tracking error in the position and orientation of a receiver in an electromagnetic tracking system, the method comprising:
   determining by a processor that there is error in a determined position and orientation of the receiver relative to the transmitter as represented by a first signal matrix created using the magnetic sensor data from the sensor magnetic coils;
   determining by the processor that the error in the position and orientation of the receiver represented by the first signal matrix exceeds a predetermined threshold;
   determining by the processor a first correction factor to compensate for the error in the position and orientation of the receiver represented by the first signal matrix, and computing by the processor a second signal matrix by applying the first correction factor to the first signal matrix;
   determining by the processor that error in the position and orientation of the receiver represented by the second signal matrix exceeds the predetermined threshold;
   determining by the processor a second correction factor to compensate for the error in the position and orientation of the receiver represented by the second signal matrix, and computing by the processor a third signal matrix by applying the second correction to the second signal matrix; and
   determining by the processor an error-corrected position and orientation of the receiver by blending positions and orientations derived from the first, second and third signal matrices.

10. A system for reducing magnetic tracking error in a determined position and orientation of a receiver in an electromagnetic tracking system, comprising:
   a transmitter having a plurality of source magnetic coils configured to generate a magnetic field, and an inertial measurement unit;
   a receiver having a plurality of sensor magnetic coils configured to sense the magnetic field and generate magnetic sensor data, and an inertial measurement unit; and
   a processor configured to:
      determine that there is error in the determined position and orientation of the receiver relative to the transmitter as represented by a first signal matrix created using the magnetic sensor data from the sensor magnetic coils;
      determine that the error in the position and orientation of the receiver represented by the first signal matrix exceeds a predetermined threshold;
      determine a first correction factor to compensate for the error in the position and orientation of the receiver represented by the first signal matrix, and compute a second signal matrix by applying the first correction factor to the first signal matrix;
      determine that error in the position and orientation of the receiver represented by the second signal matrix exceeds the predetermined threshold;
      determine a second correction factor to compensate for the error in the position and orientation of the receiver represented by the second signal matrix, and compute a third signal matrix by applying the second correction to the second signal matrix;
      determine an error-corrected signal matrix by blending the first, second and third signal matrices; and
      derive an error-corrected position and orientation of the receiver from the error-corrected signal matrix.

11. The system of claim 10 wherein the processor is configured to blend the first, second and third signal matrices by:
   determining a probability for each of the first, second and third signal matrices; and
   combining the first, second and third signal matrices according to the determined probabilities.

12. The system of claim 10 wherein the processor configured to derive the error-corrected position and orientation of the receiver from the error-corrected signal matrix is further configured to use information from a camera, optical, or ultrasonic system.

13. A method of reducing magnetic tracking error in a determined position and orientation of a receiver in an electromagnetic tracking system, comprising:
   generating a magnetic field from a plurality of source magnetic coils in a transmitter;
   generating magnetic sensor data by sensing the magnetic field using a plurality of sensor magnetic coils in a receiver;
   generating inertial measurement data from first and second inertial measurement units, one inertial measurement unit in the transmitter and the other inertial measurement unit in the receiver;
   determining by a processor that there is error in a determined position and orientation of the receiver relative to the transmitter as represented by a first signal matrix computed using the magnetic sensor data from the sensor magnetic coils;
   determining by the processor that the error in the position and orientation of the receiver represented by the first signal matrix exceeds a predetermined threshold;
   determining by the processor a first correction factor to compensate for the error in the position and orientation of the receiver relative to the transmitter as represented by the first signal matrix, and computing by the processor a second signal matrix by applying the first correction factor to the first signal matrix;
   determining by the processor that error in the position and orientation of the receiver represented by the second signal matrix exceeds the predetermined threshold;
   determining by the processor a second correction factor to compensate for the error in the position and orientation of the receiver relative to the transmitter as represented by the second signal matrix, and computing by the processor a third signal matrix by applying the second correction to the second signal matrix;
   determining by the processor an error-corrected signal matrix by blending the first, second and third signal matrices; and
   deriving an error-corrected position and orientation of the receiver from the error-corrected signal matrix.

14. The method of claim 13 wherein blending the first, second and third signal matrices further comprises:
  determining a probability for each of the first, second and third signal matrices; and
  combining the first, second and third signal matrices according to the determined probabilities.

15. The method of claim 13 wherein deriving the error-corrected position and orientation of the receiver from the error-corrected signal matrix uses information from a camera, optical, or ultrasonic system.

16. A system for reducing magnetic tracking error in a determined position and orientation of a receiver in an electromagnetic tracking system, comprising:
  a transmitter having a plurality of source magnetic coils configured to generate a magnetic field;
  a receiver having a plurality of sensor magnetic coils configured to sense the magnetic field and generate magnetic sensor data, and an inertial measurement unit; and
  a processor configured to:
    calculate a proportion of error in an uncorrected position and orientation of the receiver relative to the transmitter as represented by a signal matrix created using the magnetic sensor data from the sensor magnetic coils;
    determine a corrected position and orientation of the receiver relative to the transmitter as represented by a signal matrix created using the magnetic sensor data and constrained by data from the inertial measurement unit;
    calculate a proportion of error in the corrected position and orientation of the receiver relative to the transmitter;
    determine a probability for the uncorrected position and orientation of the receiver and the corrected position and orientation of the receiver using the proportions of error; and
    determine a position and orientation of the receiver relative to the transmitter by interpolating between the uncorrected position and orientation and the corrected position and orientation based upon the determined probabilities of each.

17. The system of claim 16 wherein the transmitter further has an inertial measurement unit, and the processor is further configured to determine the corrected position and orientation of the receiver using the magnetic sensor data constrained by data from the inertial measurement unit in the transmitter.

18. A method of reducing magnetic tracking error in a determined position and orientation of a receiver in an electromagnetic tracking system, comprising:
  generating a magnetic field from a plurality of source magnetic coils in a transmitter;
  generating magnetic sensor data by sensing the magnetic field using a plurality of sensor magnetic coils in a receiver;
  generating inertial measurement data from an inertial measurement unit in the receiver;
  calculating by a processor a proportion of error in an uncorrected position and orientation of the receiver relative to the transmitter as represented by a signal matrix created using the magnetic sensor data from the sensor magnetic coils;
  determining by the processor a corrected position and orientation of the receiver relative to the transmitter as represented by a signal matrix created using the magnetic sensor data and constrained by the inertial measurement data;
  calculating by the processor a proportion of error in the corrected position and orientation of the receiver relative to the transmitter;
  determining by the processor a probability for the uncorrected position and orientation of the receiver and the corrected position and orientation of the receiver using the proportions of error; and
  determining by the processor a position and orientation of the receiver relative to the transmitter by interpolating between the uncorrected position and orientation and the corrected position and orientation based upon the determined probabilities of each.

19. The method of claim 18 further comprising:
  generating inertial measurement date from an inertial measurement unit in the transmitter; and
  determining the corrected position and orientation of the receiver further comprises using the magnetic sensor data constrained by data from the inertial measurement unit in the transmitter.

20. A non-transitory computer readable storage medium having embodied thereon instructions for causing a computing device to execute a method for reducing magnetic tracking error in the position and orientation of a receiver in an electromagnetic tracking system, the method comprising:
  receiving magnetic sensor data representing the sensing by sensor magnetic coils in the receiver of a magnetic field generated by source magnetic coils in a transmitter, and inertial measurement data from an inertial measurement unit in the receiver;
  calculating a proportion of error in an uncorrected position and orientation of the receiver relative to the transmitter as represented by a signal matrix created using the magnetic sensor data from the sensor magnetic coils;
  determining a corrected position and orientation of the receiver relative to the transmitter as represented by a signal matrix created using the magnetic sensor data and constrained by the inertial measurement data;
  calculating by the processor a proportion of error in the corrected position and orientation of the receiver relative to the transmitter;
  determining a probability for the uncorrected position and orientation of the receiver and the distortion-corrected position and orientation of the receiver using the proportions of error; and
  determining a position and orientation of the receiver relative to the transmitter by interpolating between the uncorrected position and orientation and the distortion-corrected position and orientation based upon the determined probabilities of each.

* * * * *